United States Statutory Invention Registration [19]

[11] Reg. Number: H378

Matsumoto

[43] Published: Dec. 1, 1987

[54] SPIKED BUMPER

[75] Inventor: Isao Matsumoto, Koganei, Japan

[73] Assignee: Kioritz Corporation, Mitaka, Japan

[21] Appl. No.: 888,105

[22] Filed: Jul. 18, 1986

Related U.S. Application Data

[63] Continuation of Ser. No. 662,499, Oct. 18, 1984, abandoned.

[30] Foreign Application Priority Data

Nov. 7, 1983 [JP] Japan ..... 58-172150[U]

[51] Int. Cl.[4] ..... B23D 57/02

[52] U.S. Cl. ..... 30/382; 30/371

[58] Field of Search ..... 30/370, 371, 381, 382, 30/383

[56] References Cited

U.S. PATENT DOCUMENTS

| | | | |
|---|---|---|---|
| 2,572,405 | 10/1951 | Stone et al. | 30/371 |
| 2,665,719 | 1/1954 | Pennanen | 30/371 |
| 2,747,621 | 5/1956 | Stone et al. | 30/383 |
| 2,813,556 | 11/1957 | Woodworth | 30/371 |
| 4,123,843 | 11/1978 | Bauer et al. | 30/383 |

*Primary Examiner*—Harold J. Tudor

*Attorney, Agent, or Firm*—Browdy and Neimark

[57] ABSTRACT

A spiked-bumper mounted to a forward end portion of a main body of a chain saw includes a reference mounting hole formed at one longitudinal end portion of the spiked-bumper, and mounting adjusting holes formed at a longitudinal opposite end portion of the spiked-bumper in positions located on an arc constituting a part of an imaginary circle centered at the center of the reference mounting hole for adjusting the position in which the spiked-bumper is secured to the forward end portion of the main body of the chain saw.

5 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SPIKED BUMPER

This application is a continuation of application Ser. No. 662,499, filed Oct. 18, 1984, now abandoned.

BACKGROUND OF THE INVENTION

1. Field of the Invention

This invention relates to a spiked-bumper of a portable chain saw generally used for felling trees and producing lumber.

2. Description of the Prior Art

Generally, a chain saw usually has a spiked-bumper mounted to a forward end portion of a main body of the chain saw in a position close to a guide bar for guiding a saw chain in its movement around an outer periphery of the guide bar. The spiked-bumper is caused to press against a tree or a timber positively before a sawing operation is performed to prevent an accident from occurring inadvertently as the main body of the chain saw is pulled suddenly toward the tree or timber or the saw chain slips during operations.

Some disadvantages are associated with the spiked-bumper of the prior art. One of them is that the optimum range of application of the spiked-bumper is narrow with regard to the shape and diameter of the trees and timbers constituting the objects of the operation, so that a multiplicity of spiked-bumpers should be provided to be fitted to different types of sizes of chain saw.

SUMMARY OF THE INVENTION

1. Object of the Invention

This invention has been developed for the purpose of obviating the aforesaid disadvantage of the prior art. Accordingly, the invention has as its object the provision of a spiked-bumper of simple construction which is easy to handle and which has a wide range of application with regard to the shape and diameter of the trees and timbers.

2. Statement of the Invention

According to the invention, there is provided a spiked-bumper of a chain saw mounted to a forward end portion of a main body of the chain saw in a position close to a guide bar for guiding a saw chain in its movement around an outer periphery of the guide bar, comprising a mounting reference hole formed at one longitudinal end portion of the spiked-bumper for securing the spiked-bumper to the forward end portion of the main body of the chain saw, and at least one mounting adjusting hole formed at an longitudinal opposite end portion of the spiked-bumper in positions located on an arc constituting a part of an imaginary circle which is centered at the center of the mounting reference hole for adjusting the position in which the spiked-bumper is secured to the forward end portion of the main body of the chain saw.

The spiked-bumper of the aforesaid construction according to the invention enables the position in which it is mounted to a chain saw to be readily and positively adjusted in conformity with the shape and thickness of a tree or a timber constituting the object of a sawing operation. Thus, the spiked-bumper according to the invention is capable of achieving maximum effects in absorbing shocks in a wide range of application and can be commonly used with different types and sizes of chain saw, so that it can improve efficiency in performing the operations of felling trees and producing lumber by sawing timbers.

DETAILED DESCRIPTION OF THE PREFERRED EMBODIMENTS

Figure 1:
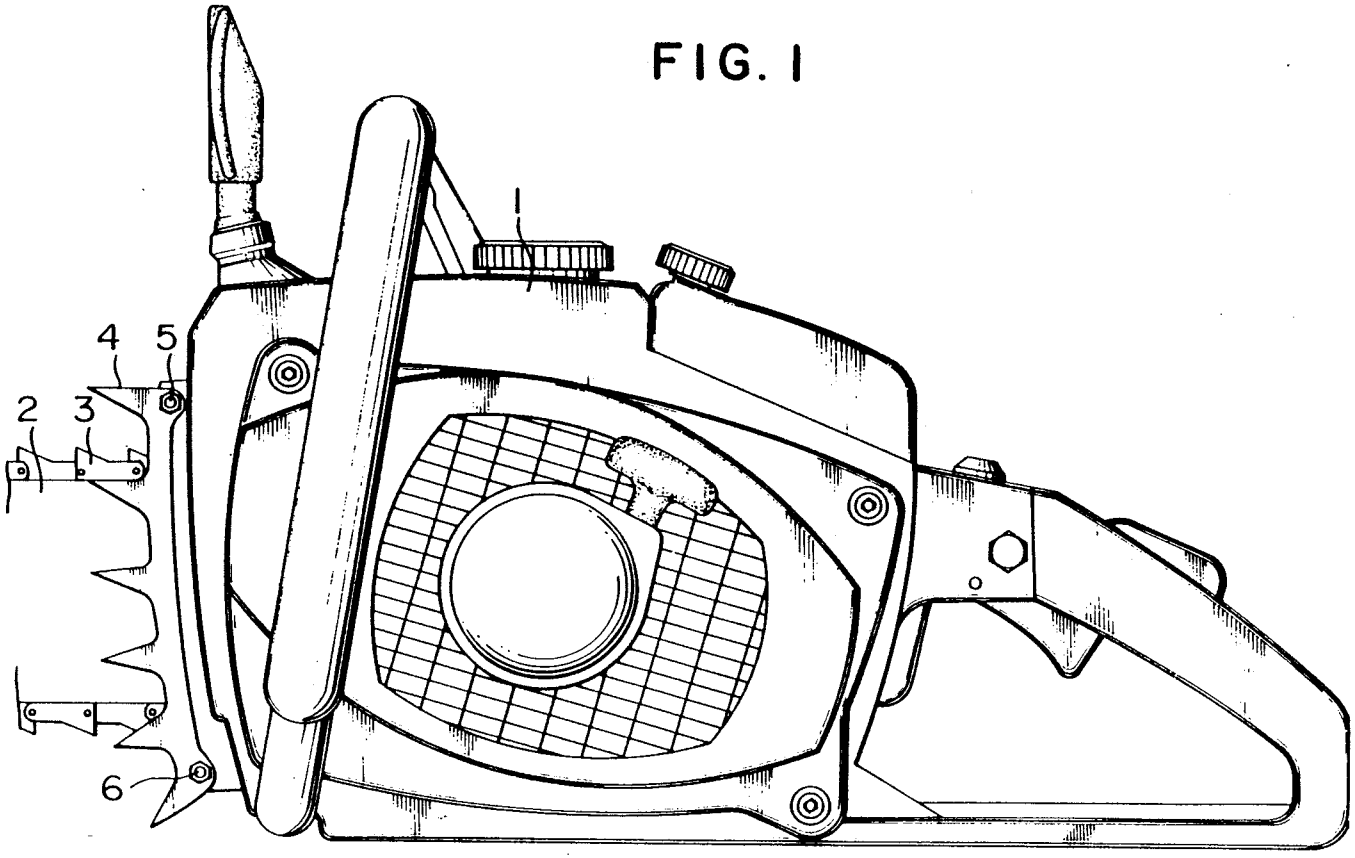
FIG. 1 is a schematic side view, with certain parts being broken away, of a chain saw having a spiked-bumper of the prior art mounted thereto.
Figure 2:
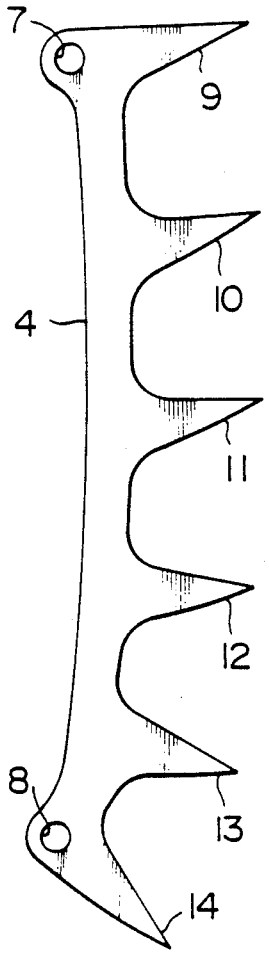
FIG. 2 is a side view, on an enlarged scale, of the spiked-bumper of the prior art shown in FIG. 1.

Before describing the preferred embodiments of the invention, a conventional chain saw provided with a spiked-bumper of the prior art will be outlined by referring to FIGS. 1 and 2, to enable the invention to be fully understood.

The conventional chain saw comprises a main body 1 having mounted therein an internal combustion engine which may be an air-cooled gasoline engine of a small size built in the main body 1 and serving as a power source. The chain saw further comprises a guide bar 2 projecting forwardly from a forward end portion of the main body 1, and a saw chain 3 mounted on an outer periphery of the guide bar 2 for movement around the outer periphery. The saw chain 3 is driven by the internal combustion engine supported in the main body 1 to saw a tree or a timber during operations.

A spiked-bumper 4 is mounted to the forward end portion of the main body 1 by a pair of bolts 5 and 6 and located in close proximity to and in parallel with an end portion of the guide bar 2 near the operator. The spiked-bumper 4, which is formed as of steel in the form of a flat bar having round holes 7 and 8 for receiving the bolts 5 and 6 respectively located at longitudinal opposite end portions as clearly seen in FIG. 2, is formed integrally with a plurality of teeth 9, 10, 11, 12, 13 and 14 located at one side thereof and extending outwardly. Of all the teeth 9–14 of the spiked-bumper 4, those teeth 12, 13 and 14 which are located near an end portion of the spiked-bumper 4 formed with the round hole 8 are shaped such that their tips are located on a curve projecting outwardly, and the spiked-bumper 4 is mounted to the forward end portion of the main body 1 in such a manner that the longitudinal end portion formed with the round hole 8 is secured in place by the bolt 6, as shown in FIG. 1, to a lower end portion of the forward end portion of the main body 1 and an opposite longitudinal end portion formed with the round hole 7 is secured in place by the bolt 5 to an upper end portion of the forward end portion of the main body 1.

Figure 3:
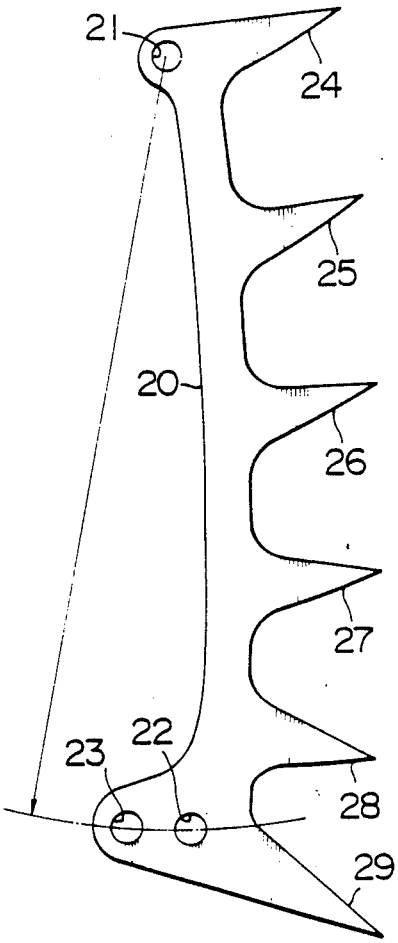
FIG. 3 is a side view of the spiked-bumper comprising one embodiment of the invention.

FIG. 3 shows one embodiment of the invention wherein a spiked-bumper 20 formed of a material similar to that used for forming the conventional spiked-bumper 4 shown in FIGS. 1 and 2 is formed with a mounting reference hole 21 at one longitudinal end portion thereof. The bolt 5 shown in FIG. 1 is threadably engaged in the mounting reference hole 21 and connected to the forward end portion of the main body 1 of the chain saw, so that the one longitudinal end portion of the spiked-bumper 20 having the mounting reference hole 21 is secured and rigidly fixed to the upper end portion of the forward end portion of the main body 1. As can be seen, the hole 21 is located beyond the upper edge of the chain guide bar 2.

The spiked-bumper 20 is further formed with two mounting adjusting holes 22 and 23 at an longitudinal opposite end portion thereof. The two adjusting mounting holes 22 and 23 each have a center located on a short arc forming a part of an imaginary circle centered at the center of the mounting reference hole 21, it being seen that the length of the arc is smaller than the distance between the hole 21 and the arc. When the chain saw is used, the bolt 6 shown in FIG. 1 is passed through one of the mounting adjusting holes 22 and 23 to secure and rigidly fix the longitudinal opposite end portion of the spiked-bumper 20 to the lower end portion of the forward end portion of the main body 1 of the chain saw, which is beyond the lower edge of the chain guide bar 2.

The spiked-bumper 20 is formed integrally with six teeth 24, 25, 26, 27, 28 and 29 located at one side thereof and extending outwardly. Of all the teeth 24–29, those teeth 27, 28 and 29 which are located near the longitudinal opposite end portion formed with the mounting adjusting holes 22 and 23 are shaped such that their tips are located on a substantially straight line, so that they can readily catch against a tree or a timber.

Figure 4:
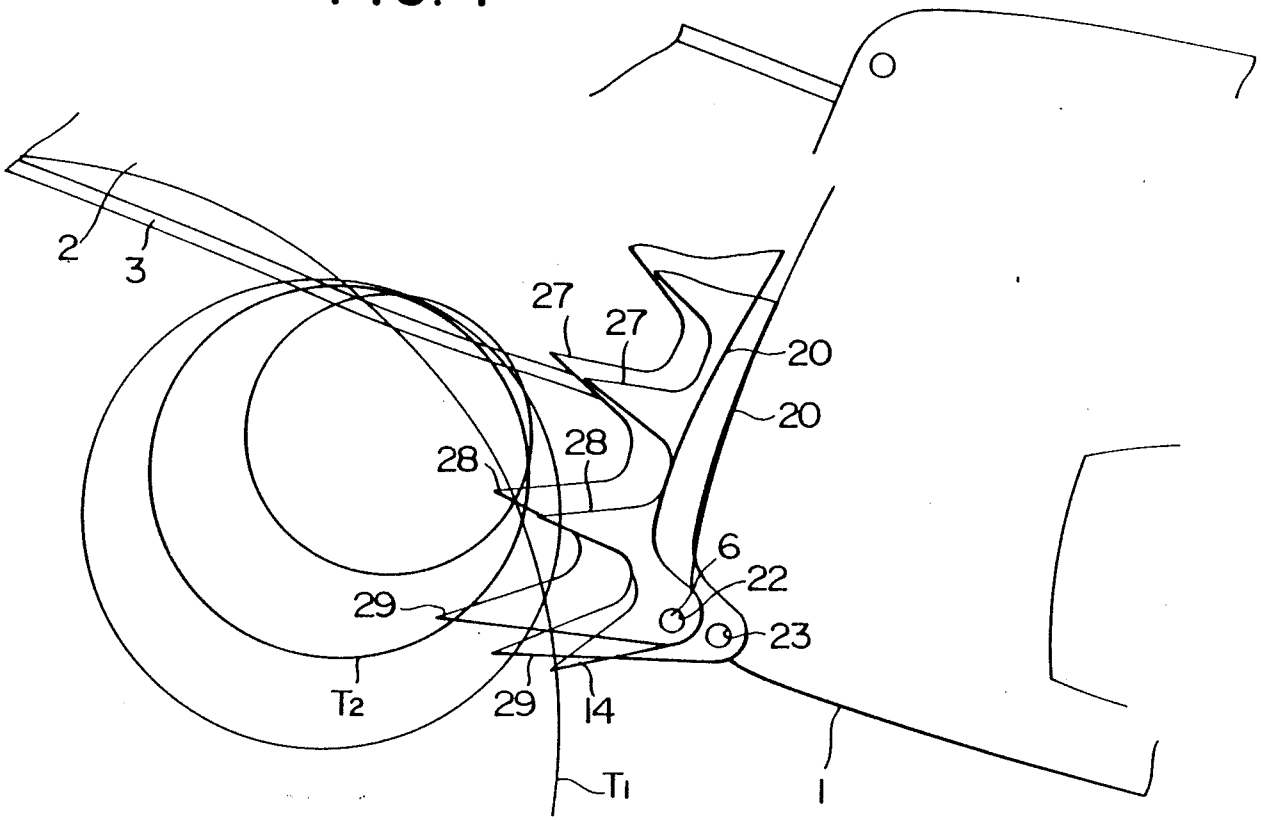
FIG. 4 is a view in explanation of the manner in which the spiked-bumper shown in FIG. 3 is used.

Operation of the spiked-bumper 20 according to the invention will be described by referring to FIG. 4. When an operation is performed to saw a tree $T_1$ of a relatively large diameter, the bolt 6 is inserted in the mounting adjusting hole 23 and the longitudinal opposite end portion or a lower end portion of the spiked-bumper 20 is secured to the main body 1 in a position close to the main body 1. By this arrangement, the chain saw can be optimally positioned against the tree $T_1$ with the teeth 28 and 29 pressing thereagainst. When the tree to be sawed is a tree $T_2$ of a relatively small diameter, the bolt 6 is inserted in the mounting adjusting hole 22 and the spiked-bumper 20 is secured to the main body 1 in a position in which the lower end portion of the spiked-bumper 20 projects forwardly. When the spiked-bumper 20 is in this position, it is capable of achieving a maximum shock absorbing effect with the teeth 28 and 29 positively pressing against the tree $T_2$.

Figure 5:
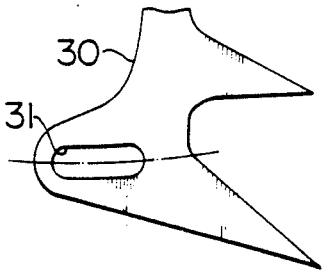
FIG. 5 is a side view, with certain parts being broken away, of the spiked-bumper comprising another embodiment of the invention.

FIG. 5 shows another embodiment of the invention in which the spiked-bumper 30 is formed at one longitudinal end portion with a mounting reference hole, not shown, and at an longitudinal opposite end portion with a mounting adjusting slot 31 in the form of an arc forming a part of an imaginary circle which is centered at the center of the mounting reference hole at the one longitudinal end portion of the spiked-bumper 30. The position in which the longitudinal opposite end portion or lower end portion of the spiked-bumper 30 is secured to the main body 1 of the chain saw can be freely selected within the range of the length of the mounting adjusting slot 31.

What is claimed is:

1. An elongated spiked-bumper mounted to a forward end portion of a main body of a chain saw in a position adjacent and transverse to a guide bar for guiding a saw chain in its movement around an outer periphery of the guide bar, comprising:

a mounting reference hole formed at one longitudinal end portion of the spiked-bumper for securing the spiked-bumper to the forward end portion of the main body of the chain saw beyond one edge of the guide bar; and at least one mounting adjusting hole formed at a lower longitudinal opposite end portion of the spiked-bumper, positioned beyond the other edge of the guide bar, said at least one mounting adjusting hole effectively extending on a short arc constituting a part of an imaginary circle which is centered at the center of the mounting reference hole for adjusting the position in which the spiked-bumper is secured to the forward end portion of the main body of the chain saw;

wherein said spiked-bumper is rotably adjustable to move said lower longitudinal opposite end portion forward for sawing smaller trees.

2. A spiked-bumper as claimed in claim 1, wherein said at least one mounting adjusting hole comprises two round holes located in positions spaced apart from each other in the direction of the arc.

3. A spiked-bumper as claimed in claim 1, wherein said at least one mounting adjusting hole comprises a slot extending in the direction of the arc.

4. A spiked-bumper as claimed in claim 1, comprising at least two teeth extending outwardly from one side of the spiked-bumper near the longitudinal opposite end portion of the spiked-bumper at which said at least one mounting adjusting hole is formed, said teeth being shaped such that their tips are located on a substantially straight line.

5. An elongated spiked-bumper mounted to a forward end portion of a main body of a chain saw in a position adjacent and transverse to a guide bar for guiding a saw chain in its movement around an outer periphery of the guide bar, comprising:

a mounting reference hole formed at an upper longitudinal end portion of the spiked-bumper for securing the spiked-bumper to the forward upper end portion of the main body of the chain saw; and adjusting hole means formed at a lower longitudinal opposite end portion of the spiked-bumper to provide a plurality of rigidly fixed mounting positions located on an arc constituting a part of an imaginary circle which is centered at the center of the mounting reference hole, for adjusting and rigidly fixing the position in which the spiked-bumper is secured to the forward bottom end portion of the main body of the chain saw, the length of the arc along which said bottom end portion of the spiked-bumper can move being smaller than the distance between the mounting reference hole and the arc;

said elongated spiked-bumper having a number of teeth greater than three, and wherein the bottom three teeth are shaped such that their tips are located on a substantially straight line;

wherein said spiked-bumper is rotably adjustable to move said lower longitudinal opposite end portion forward for sawing smaller trees.

* * * * *